United States Patent
Nilsson et al.

(10) Patent No.: US 11,956,765 B2
(45) Date of Patent: Apr. 9, 2024

(54) UE RX BEAM SWITCHING DURING UE BEAM TRAINING

(71) Applicant: Telefonaktiebolaget LM Ericsson (publ), Stockholm (SE)

(72) Inventors: Andreas Nilsson, Gothenburg (SE); Fredrik Athley, Kullavik (SE); Sebastian Faxér, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 26 days.

(21) Appl. No.: 15/561,107

(22) PCT Filed: Jul. 4, 2017

(86) PCT No.: PCT/EP2017/066623
§ 371 (c)(1),
(2) Date: Sep. 25, 2017

(87) PCT Pub. No.: WO2019/007483
PCT Pub. Date: Jan. 10, 2019

(65) Prior Publication Data
US 2019/0014568 A1    Jan. 10, 2019

(51) Int. Cl.
*H04B 7/02*    (2018.01)
*H04B 7/04*    (2017.01)
(Continued)

(52) U.S. Cl.
CPC ........ *H04W 72/046* (2013.01); *H04B 7/0456* (2013.01); *H04B 7/088* (2013.01);
(Continued)

(58) Field of Classification Search
CPC .... H04B 7/0408; H04B 7/0617; H04B 7/088; H04B 7/0695; H04W 74/0446; H04W 72/046; H04W 16/28; H04W 72/02
(Continued)

(56) References Cited

U.S. PATENT DOCUMENTS

| | | |
|---|---|---|
| 9,252,853 B2 | 2/2016 | Sajadieh et al. |
| 2001/0012775 A1* | 8/2001 | Modzelesky ...... H04B 7/18539 |
| | | 455/427 |

(Continued)

FOREIGN PATENT DOCUMENTS

| | | |
|---|---|---|
| CN | 103703709 A | 4/2014 |
| CN | 104734754 A | 6/2015 |

(Continued)

OTHER PUBLICATIONS

Invitation to Pay Additional Fees and Partial International Search Report issued in International Application No. PCT/EP2017/066623, dated Mar. 20, 2018, 16 pages.

(Continued)

*Primary Examiner* — Khaled M Kassim
*Assistant Examiner* — Jason A Harley
(74) *Attorney, Agent, or Firm* — Rothwell, Figg, Ernst & Manbeck, P.C.

(57) ABSTRACT

A method for receive (RX) beam switching is provided. The method may be performed by a user equipment (UE) (420). The method includes using a current RX beam (412) to receive a transmission from a network node (422). The method further includes selecting (706) a new RX beam (414) to replace the current RX beam (412). The method further includes, after selecting (706) the new RX beam (414), transmitting (708-710) a channel state information (CSI) report to the network node (422). The method further includes, after selecting (706) the new RX beam (414) and before transmitting (708-710) the CSI report, continuing to use the current RX beam (412) to receive transmissions from the network node (422). The method further includes, after transmitting (708-710) the CSI report to the network node (422), replacing (714) the current RX beam (412) with the new RX beam (414) such that the new RX beam (414)

(Continued)

instead of the current RX beam (412) is used to receive transmissions from the network node.

21 Claims, 13 Drawing Sheets

(51) Int. Cl.
| | |
|---|---|
| *H04B 7/0408* | (2017.01) |
| *H04B 7/0456* | (2017.01) |
| *H04B 7/06* | (2006.01) |
| *H04B 7/08* | (2006.01) |
| *H04W 24/08* | (2009.01) |
| *H04W 56/00* | (2009.01) |
| *H04W 72/04* | (2023.01) |
| *H04W 72/044* | (2023.01) |
| *H04W 72/21* | (2023.01) |
| *H04W 72/23* | (2023.01) |
| *H04W 76/11* | (2018.01) |

(52) U.S. Cl.
CPC ........... *H04W 24/08* (2013.01); *H04W 72/21* (2023.01); *H04W 72/23* (2023.01)

(58) Field of Classification Search
USPC ........................................................ 370/329
See application file for complete search history.

(56) References Cited

U.S. PATENT DOCUMENTS

| | | | | |
|---|---|---|---|---|
| 2003/0152086 | A1* | 8/2003 | El Batt | H04W 74/0816 370/400 |
| 2009/0086690 | A1* | 4/2009 | Gu | H04B 7/0417 370/338 |
| 2009/0290563 | A1* | 11/2009 | Gu | H04B 7/0608 370/338 |
| 2013/0336112 | A1* | 12/2013 | Liu | H04W 28/0289 370/230 |
| 2014/0211731 | A1* | 7/2014 | Inoue | H04B 7/0456 370/329 |
| 2014/0328266 | A1* | 11/2014 | Yu | H04L 5/0053 370/329 |
| 2016/0080060 | A1* | 3/2016 | Yu | H04B 7/0626 455/452.2 |
| 2016/0142189 | A1* | 5/2016 | Shin | H04B 7/0626 370/329 |
| 2016/0164588 | A1* | 6/2016 | Chen | H04B 7/0469 375/267 |
| 2016/0381596 | A1* | 12/2016 | Hu | G06F 9/00 370/236 |
| 2017/0093482 | A1* | 3/2017 | Keshet | H04B 7/212 |
| 2017/0207843 | A1* | 7/2017 | Jung | H04B 7/0695 |
| 2017/0231011 | A1* | 8/2017 | Park | H04W 16/14 |
| 2018/0034531 | A1* | 2/2018 | Sadiq | H04B 7/0695 |
| 2018/0049042 | A1* | 2/2018 | Yu | H04B 7/0695 |
| 2018/0167883 | A1* | 6/2018 | Guo | H04W 72/046 |
| 2018/0206132 | A1* | 7/2018 | Guo | H04B 7/0404 |
| 2018/0227035 | A1* | 8/2018 | Cheng | H04B 7/0695 |
| 2018/0234957 | A1* | 8/2018 | Kim | H04L 1/1607 |
| 2018/0234959 | A1* | 8/2018 | Ahn | H04W 72/042 |
| 2018/0278319 | A1* | 9/2018 | Cezanne | H04B 7/0617 |
| 2018/0279364 | A1* | 9/2018 | Hui | H04W 74/0833 |
| 2018/0287841 | A1* | 10/2018 | Subramanian | H04B 7/04 |
| 2018/0375556 | A1* | 12/2018 | Wang | H04B 7/061 |
| 2018/0375558 | A1* | 12/2018 | Takahashi | H04B 7/0695 |
| 2019/0013857 | A1* | 1/2019 | Zhang | H04W 74/04 |
| 2019/0020657 | A1* | 1/2019 | Egner | G06Q 20/3224 |
| 2019/0052331 | A1* | 2/2019 | Chang | H04B 7/0617 |
| 2019/0059013 | A1* | 2/2019 | Rahman | H04B 7/0695 |
| 2019/0081674 | A1* | 3/2019 | Oteri | H04B 7/0617 |
| 2019/0081687 | A1* | 3/2019 | Sadiq | H04W 72/046 |
| 2019/0089435 | A1* | 3/2019 | Mondal | H04B 7/088 |
| 2019/0141693 | A1* | 5/2019 | Guo | H04B 7/00 |
| 2019/0312668 | A1* | 10/2019 | Park | H04L 5/0023 |
| 2019/0313389 | A1* | 10/2019 | Wilson et al. | H04L 1/1861 |

FOREIGN PATENT DOCUMENTS

| | | |
|---|---|---|
| CN | 105556869 A | 5/2016 |
| CN | 106160807 A | 11/2016 |
| CN | 106412942 A | 2/2017 |
| WO | 2017068547 A1 | 4/2017 |
| WO | 2017/091137 A1 | 6/2017 |
| WO | 2017/095467 A1 | 6/2017 |

OTHER PUBLICATIONS

International Search Report and Written Opinion issued in International Application No. PCT/EP2017/066623, dated Apr. 18, 2018, 25 pages.
3GPP TSG-RAN WG1 #89ah-NR, R1-1711023, "Analysis of beam indication signalling options", Ericsson, Qingdao, China, Jun. 27-30, 2017, 9 pages.
Written Opinion of the International Preliminary Examining Authority issued in International Application No. PCT/EP2017/066623, dated Jul. 15, 2019 (9 pages).
Qualcomm Incorporated, "Discussion on QCL", 3GPP TSG RAN WG1 NR Ad-Hoc#2, R1-1711176, Qingdao, China Jun. 27-30, 2017 (4 pages).
Indian Office Action and English Translation, issued in corresponding Indian Patent Application No. 201747032996 dated Feb. 10, 2020, 6 pages.
Ericsson, "Further results on beam management without beam indication", 3GPP TSG-RAN WG1 #89, R1-1708682, Hangzhou, China, May 15-19, 2017 (8 pages).

* cited by examiner

UE RX BEAM SWITCHING DURING UE BEAM TRAINING

CROSS REFERENCE TO RELATED APPLICATION(S)

This application is a 35 U.S.C. § 371 National Stage of International Patent Application No. PCT/EP2017/066623, filed Jul. 4, 2017, designating the United States, the disclosure of which is incorporated by reference.

TECHNICAL FIELD

Disclosed are embodiments related to UE RX beam switching in communication systems that employ beamforming.

BACKGROUND

The next generation mobile wireless communication system (5G) (a.k.a. new radio (NR)), will support a diverse set of use cases and a diverse set of deployment scenarios. Such deployment scenarios include deployment at both low frequencies (e.g., 100s of MHz), which is similar to LTE today, and also at very high frequencies (e.g., mm waves in the tens of GHz).

Similar to LTE, NR will use orthogonal frequency-division multiplexing (OFDM) in both the downlink (i.e. from a network node (e.g., gNB, eNB, base station) to a receiving entity (a.k.a., user equipment (UE)) and the uplink (i.e. from the receiving entity (e.g., UE, UE) to the network node (e.g., gNB, eNB, base station). Both DFT-spread OFDM and OFDM will be supported.

1. NR Frame Structure

The basic NR physical resource can be seen as a time-frequency grid similar to the one in LTE as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (a.k.a. numerologies) in NR are given by $\Delta f=(15\times 2^\alpha)$ kHz where $\alpha$ is a non-negative integer.

As shown in FIG. 1, for a given subframe 102 (e.g., having length 0.5 ms), a resource block 104 occupies a portion of the subframe's frequency allotment. Resource block 104 is, in turn, broken up into slots in the time domain (as shown, slots 0 and 1), each slot being broken up into a number of OFDM symbols in the time domain (as shown, symbols 0-6). Resource block 104 is also broken up in the frequency domain, forming a number of subcarriers (here, as described above, having a constant 15 kHz spacing). A given subcarrier and OFDM symbol within a slot of resource block 104 addresses a single resource element 106.

Resource allocation in LTE is typically described in terms of resource blocks (such as resource block 104), where a resource block corresponds to one slot (e.g., 0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency, but as of this disclosure, the number of slots or other units in time domain is marked for further study.

In the time domain, downlink and uplink transmissions in NR will be organized into equally-sized subframes, similar to LTE and as shown in FIG. 2. In NR, subframe length for a reference numerology of $(15\times 2^\alpha)$ kHz is exactly $\frac{1}{2}^\alpha$ ms (i.e. $2^{-\alpha}$ ms). FIG. 2 shows a radio frame 202 (part of a sequence of frames 200), having a duration of 10 ms. Radio frame 202 is broken up into equally-sized subframes 204 (labeled #0, #1, ..., #9), each having a duration of 1 ms. Thus, as shown in FIG. 2, $\alpha=0$.

Downlink transmissions are dynamically scheduled, i.e., in each subframe the network node (e.g., gNB) transmits downlink control information (DCI) about which UE data is to be transmitted to and which resource blocks in the current downlink subframe the data is transmitted on. This control signaling is typically transmitted in the first one or two OFDM symbols in each subframe in NR. The control information is carried on Physical Control Channel (PDCCH) and data is carried on Physical Downlink Shared Channel (PDSCH). A UE first detects and decodes control information carried on the PDCCH; if such control information on the PDCCH is decoded successfully, the UE then decodes the corresponding data on the PDSCH based on the decoded control information in the PDCCH.

Uplink data transmissions are also dynamically scheduled using PDCCH. Similar to downlink, a UE first decodes uplink grants in the PDCCH and then transmits data over the Physical Uplink Shared Channel (PUSCH) based the decoded control information in the uplink grant such as modulation order, coding rate, uplink resource allocation, etc.

In addition to PUSCH, Physical Uplink Control Channel (PUCCH) is also supported in NR to carry uplink control information (UCI) such as Hybrid Automatic Repeat Request (HARM) related Acknowledgements (ACKs), Negative Acknowledgements (NACKs), or Channel State Information (CSI) feedback.

Although many details of NR PUCCH are still to be determined at the time of this disclosure, it is envisioned that, similar to LTE, PUCCH resources will be pre-allocated in a cell and shared by all UEs.

2. Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

A core component in NR is the support of MIMO antenna deployments and MIMO related techniques. NR will support an 8-layer spatial multiplexing mode for a large number of antenna ports with channel-dependent precoding. The spatial multiplexing mode is aimed for high data rates in favorable channel conditions. An illustration of the transmission structure of the precoded spatial multiplexing operation is provided in FIG. 3.

As shown in FIG. 3, the information carrying symbol vector s is multiplied by an $N_T \times r$ precoder matrix W (a.k.a. matrix 304), which serves to distribute the transmit energy in a subspace of the $N_T$-dimensional vector space (corresponding to $N_T$ transmission antenna ports). The precoder matrix 304 is typically selected from a codebook of possible precoder matrices, and typically indicated by means of a precoder matrix indicator (PMI), which specifies a unique precoder matrix in the codebook for a given number of symbol streams. The r symbols in s each correspond to a layer 302 and r is referred to as the transmission rank. In this way, spatial multiplexing is achieved since multiple symbols can be transmitted simultaneously over the same time/frequency resource element (TFRE). The number of symbols r is typically adapted to suit the current channel properties. As shown, following application of precoder matrix 304, each of the resulting $N_T$ outputs is fed into inverse fast Fourier transform (IFFT) 306.

NR uses OFDM in the downlink, and hence the received $N_R \times 1$ vector $y_n$ for a certain TFRE on subcarrier n (or alternatively data TFRE number n) can be modeled by Equation 1 below:

$$y_n = H_n W s_n + e_n \qquad \text{(Equation 1)}$$

In Equation 1, $H_n$ is the MIMO channel matrix for subcarrier n having size $N_R \times N_T$, where $N_R$ represents the number of receiving antenna ports and $N_T$ represents the number of transmitting antenna ports. W is precoding matrix 304 for subcarrier n, of size $N_T \times r$. $s_n$ is the symbol vector for subcarrier n, containing r symbols. $e_n$ is a noise/interference vector, of size $N_R \times 1$, obtained e.g. as realizations of a random process.

The precoder matrix W can be a wideband precoder, which is constant over frequency, or frequency selective. The precoder matrix W is often chosen to match the characteristics of the $N_R \times N_T$ MIMO channel matrix $H_n$, resulting in so-called channel-dependent precoding. This is also commonly referred to as closed-loop precoding and essentially strives for focusing the transmit energy into a subspace which is strong in the sense of conveying much of the transmitted energy to the UE. In addition, the precoder matrix W may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel, as shown in Equation 2 below:

$$\max_k \|\hat{H}_n W_k\|_F^2 \qquad \text{(Equation 2)}$$

In Equation 2, $\hat{H}_n$ a channel estimate, possibly derived from CSI-RS. $W_k$ is a hypothesized precoder matrix with index k. The matrix product $\hat{H}_n W_k$ is the hypothesized equivalent channel, of size $N_R \times r$. $\| \|_F$ denotes the Frobenius norm. In the max operator, index k runs over the valid precoding indices.

In closed-loop precoding for the NR downlink, the UE transmits, based on channel measurements in the forward link (downlink), recommendations to the gNB of a suitable precoder to use. The gNB transmits CSI-RS in the DL and configures the UE to use measurements of CSI-RS to report back recommended precoding matrices that the UE selects from a codebook. A single precoder that is supposed to cover a large bandwidth (wideband precoding) may be reported back. It may also be beneficial to match the frequency variations of the channel and instead report back a frequency-selective precoding report, e.g. several precoders, one per subband. This is an example of the more general case of channel state information (CSI) feedback, which also encompasses reporting back other information besides recommended precoders (e.g., PMI) in order to assist the gNB in subsequent transmissions to the UE. Such other information may include channel quality indicators (CQIs) as well as transmission rank indicators (RIs).

3. Beam Management

Narrow beam transmission and reception schemes will be needed at higher frequencies to compensate the high propagation loss. For a given communication link, a beam can be applied at both the transmission point (TRP) and the UE; these two beams are referred to as a beam pair link (BPL). The task of the beam management procedure is to discover and maintain beam pair links.

FIG. 4 illustrates an example case of beam management. As shown in FIG. 4, TRP 422 may include a number of beams 402, 404, 406, 408, 410. Such beams may arise from one or more antenna arrangements controlled by TRP 422. UE 420 may also include a number of beams, such as beams 412 and 414. As shown, beam 406 (of TRP 422) and beam 412 (of UE 420) comprise the BPL 416.

In the example of FIG. 4, one BPL has been discovered and is being maintained by the network. A BPL (i.e. both the TRP beam and UE beam) is expected to be discovered and monitored by the network using measurements on downlink reference signals used for beam management, such as the CSI reference signals (CSI-RS) (CSI-RS has been agreed in 3GPP as a beam reference signal for New Radio (NR)). The CSI-RS for beam management can be transmitted periodically, semi-persistently, or aperiodically (e.g., event triggered), and the CSI-RS can be either shared between multiple UEs or be UE-specific. In order to find a suitable TRP beam, the TRP transmits CSI-RS in different TRP TX beams on which the UE performs reference signal measurements, such as Reference Signal Received Power (RSRP) measurements, and reports back the N-best TRP TX beams (where N can be configured by the network). Furthermore, the CSI-RS transmission on a given TRP beam can be repeated to allow the UE to evaluate suitable UE RX beams, a so called "P3 procedure" (referred to here as UE RX beam training). After a UE RX beam training procedure, the UE will likely report back a new CSI report (including e.g., CRI, PMI, CQI, etc.) to the TRP for the updated UE RX beam, such that the TRP can adjust its precoding, modulation and coding scheme (MCS), rank, etc. to the new UE RX beam.

There are basically three different implementations of beamforming, both at the TRP and at the UE: analog beamforming, digital beamforming, and hybrid beamforming. Each implementation has its pros and cons. Digital beamforming is the most flexible solution but also the costliest due to the large number of required radios and baseband chains. Analog beamforming is the least flexible but cheaper to manufacture due to reduced number of radio and baseband chains. Hybrid beamforming is a compromise between the analog and digital beamforming. One type of beamforming antenna architecture that has been agreed to study in 3GPP for the NR access technology is the concept of antenna panels, both at the TRP and at the UE. As shown in FIG. 5, a panel 502, 506 is an antenna array of dual-polarized elements 504 with typically one transmit/receive unit (TXRU) per polarization. An analog distribution network with phase shifters is used to steer the beam of each panel 502, 506. FIG. 5 illustrates two examples of panels (a two-dimensional panel 502 and one-dimensional panel 506), where each panel 502, 506 is connected to one TXRU per polarization.

SUMMARY

There is a delay between when the UE selects the best UE RX beam during the UE RX beam training procedure and when the TRP has received an updated CSI report from the UE for the updated UE RX beam. An example of this delay is illustrated in FIG. 6. As shown, the UE beam training procedure is performed in the first slot, after which the UE has selected an updated RX beam. In the coming three slots (slots 2, 3, and 4) the UE is scheduled for DL data transmission; and in slot 5, the UE will transmit a CSI report to the TRP for the new UE RX beam. Accordingly, if the UE changes the UE RX beam directly after the UE beam training (i.e., before the UE transmits the new CSI report), there is a risk that the new UE RX beam will deteriorate the DL transmission in slots 2-4, since the DL precoder matrix, rank, and MCS used by the TRP for these DL transmissions is based on the old UE RX beam. One problem with existing solutions is that they do not address this delay, and do not describe how to optimally or efficiently conduct beam switching following a beam training procedure.

According to one aspect, a method for receive (RX) beam switching is provided. The method may be performed by a UE. The method includes using a current RX beam to receive a transmission from a network node. The method further includes selecting a new RX beam to replace the current RX beam. The method further includes, after selecting the new RX beam, transmitting a channel state information (CSI) report to the network node. The method further includes, after selecting the new RX beam and before transmitting the CSI report, continuing to use the current RX beam to receive transmissions from the network node. The method further includes, after transmitting the CSI report to the network node, replacing the current RX beam with the new RX beam such that the new RX beam instead of the current RX beam is used to receive transmissions from the network node.

For example, the UE may wait to change to the new UE RX beam until the UE has reported back the CSI to the TRP for this new UE RX beam (e.g., during or after slot 5 in FIG. 6). In some embodiments, the UE may wait a predetermined amount of time after the reported CSI to also account for potential processing time of the CSI report at the TRP (e.g., the UE may wait an additional slot).

According to another aspect, a method for receive (RX) beam switching is provided. The method may be performed by a UE. The method includes transmitting a first CSI report to a network node, the first CSI report being related to a current RX beam. The method further includes using the current RX beam to receive a transmission from a network node. The method further includes selecting a new RX beam to replace the current RX beam. The method further includes, after selecting the new RX beam to replace the current RX beam, determining, based on the new RX beam and information included in the first CSI report, whether to delay the replacement of the current RX beam with the new RX beam until after a second CSI report has been transmitted to the network node.

For example, if the UE determines that the new UE RX beam is better as compared to the old UE RX beam, for the last reported CSI (e.g. for the last reported PMI, CQI, and RI that the UE reported to the TRP) (e.g., better as determined by comparing estimated throughput, Shannon capacity, and/ or rank, of the two beams), then the UE may immediately switch to the new UE RX beam (e.g., directly after slot 1 in FIG. 6). Otherwise, if the new UE RX beam is not better, the UE may wait until the new CSI report has been signaled (e.g., after slot 5 in FIG. 6), and may also wait a predetermined amount of time after the reported CSI to also account for potential processing time of the CSI report at the TRP (e.g., the UE may wait an additional slot).

In some embodiments, selecting the new RX beam to replace the current RX beam includes (1) receiving, from the network node, a plurality of CSI reference symbols (CSI-RSs) corresponding to one or more transmit (TX) beams; (2) performing reference-signal (RS) measurements on the plurality of CSI-RS s; and (3) comparing the RS measurements. In some embodiments, selecting the new RX beam to replace the current RX beam may also (and/or additionally) include sweeping through a plurality of UE RX candidate beams (412, 414) while performing the RS measurements.

In some embodiments, selecting the new RX beam to replace the current RX beam may be performed in response to a trigger from the network node; and in some embodiments, the trigger may indicate that the network node will hold its TX beam constant for the entire CSI-RS transmission and that no CSI report is expected from the UE for at least a time duration. In some embodiments, a downlink control information (DCI) containing the trigger does not include an uplink grant for subsequent PUSCH and/or PUCCH transmission. In some embodiments, transmitting the CSI report to the network node is performed in response to a trigger received from the network node. In other embodiments, transmitting the CSI report to the network node is performed in response to a prescheduled periodic timer.

In some embodiments, replacing the current RX beam with the new RX beam is performed a predetermined time offset (e.g., a predetermined number of slots) after transmitting the CSI report to the network node. In some embodiments, a first beam pair link comprising a first UE RX beam (412, 414) and a first network node TX beam and a second beam pair link comprising a second UE RX beam (412, 414) and a second network node TX beam are maintained, and the network node indicates which of the first or second beam pair link the UE shall use at a given time.

According to some embodiments, determining, based on the new RX beam and information included in the first CSI report, whether to delay the replacement of the current RX beam with the new RX beam until after a second CSI report has been transmitted to the network node includes evaluating whether the new RX beam or old RX beam has better performance with a precoding matrix indicated by the first CSI report. In some embodiments, the new RX beam has better performance than the old RX beam with the precoding matrix indicated by the first CSI report if and only if the new RX beam has a higher estimated throughput than the old RX beam; or if and only if the new RX beam has a higher estimated Shannon capacity than the old RX beam; or if and only if the new RX beam has a higher rank than the old RX beam.

In some embodiments, the method further includes, after determining, based on the new RX beam and information included in the first CSI report, not to delay the replacement of the current RX beam with the new RX beam until after a second CSI report has been transmitted to the network node, immediately replacing the current RX beam with the new RX beam such that the new RX beam instead of the current RX beam is used to receive a transmissions from the network node. In some embodiments, the method further includes, after determining, based on the new RX beam and information included in the first CSI report, to delay the replacement of the current RX beam with the new RX beam until after a second CSI report has been transmitted to the network node, (1) continuing to use the current RX beam to receive transmissions from the network node; and (2) transmitting the second CSI report to the network node; and after transmitting the second CSI report to the network node, replacing the current RX beam with the new RX beam such that the new RX beam instead of the current RX beam is used to receive a transmissions from the network node.

Advantages

One advantage of embodiments is that the signal-to-interference-plus-noise ratio (SINR) for the received DL data between the time of a UE RX beam training procedure until the TRP has updated its precoder, MCS, and rank, for the new UE RX beam will not be deteriorated.

BRIEF DESCRIPTION OF THE DRAWINGS

The accompanying drawings, which are incorporated herein and form part of the specification, illustrate various embodiments.

DETAILED DESCRIPTION

Figure 1:
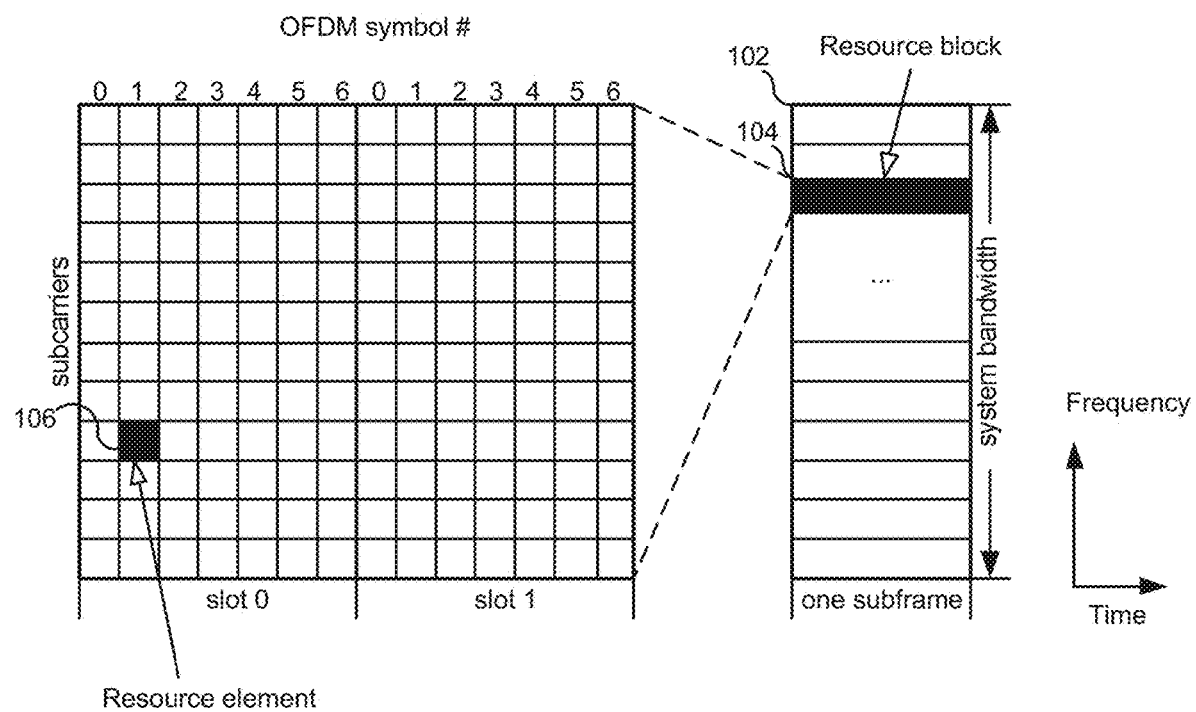
FIG. 1 illustrates physical resources as used in communication systems.
Figure 2:
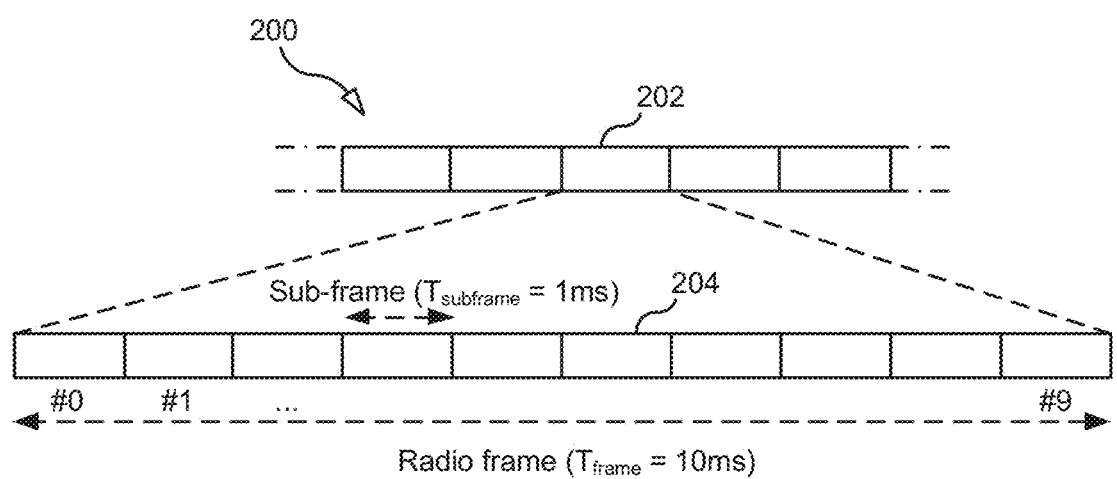
FIG. 2 illustrates a radio frame time-domain structure as used in communication systems.
Figure 3:
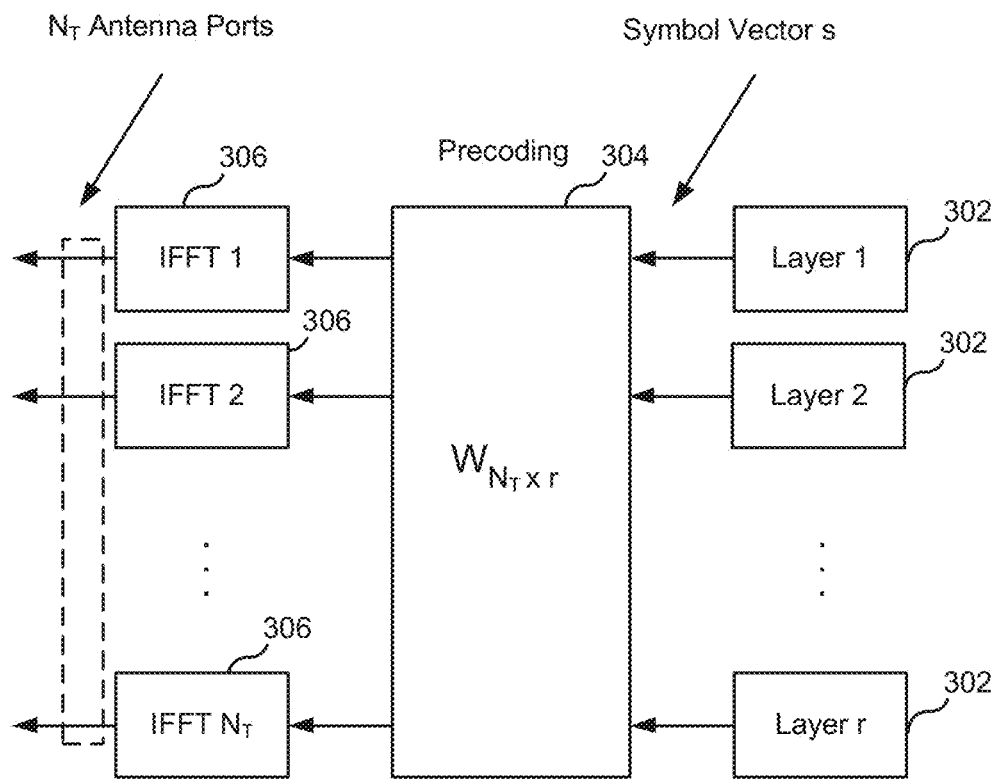
FIG. 3 illustrates a block diagram of precoded spatial multiplexing as used in communication systems.
Figure 4:
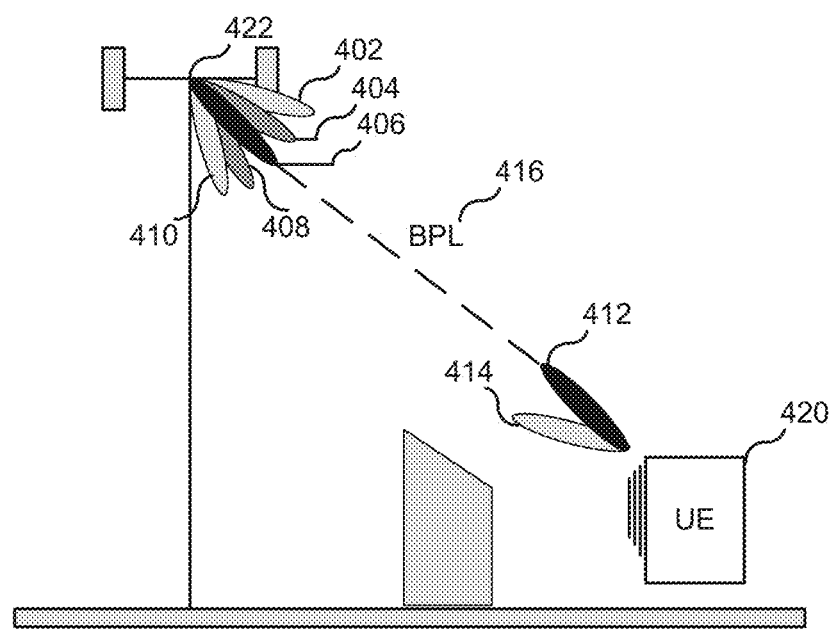
FIG. 4 illustrates a beam pair link as used in communication systems.
Figure 5:
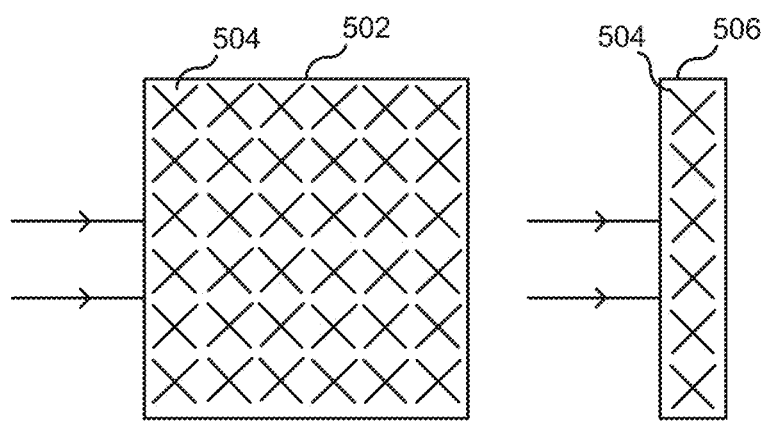
FIG. 5 illustrates antenna arrays as used in communication systems.
Figure 6:
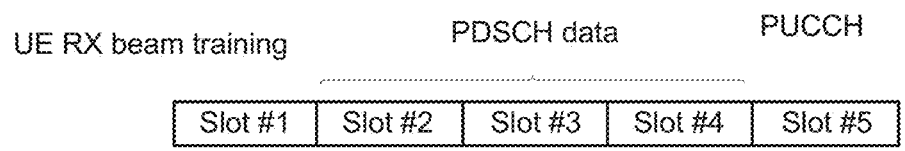
FIG. 6 illustrates a delay from UE beam training until a CSI report is transmitted.
Figure 7:
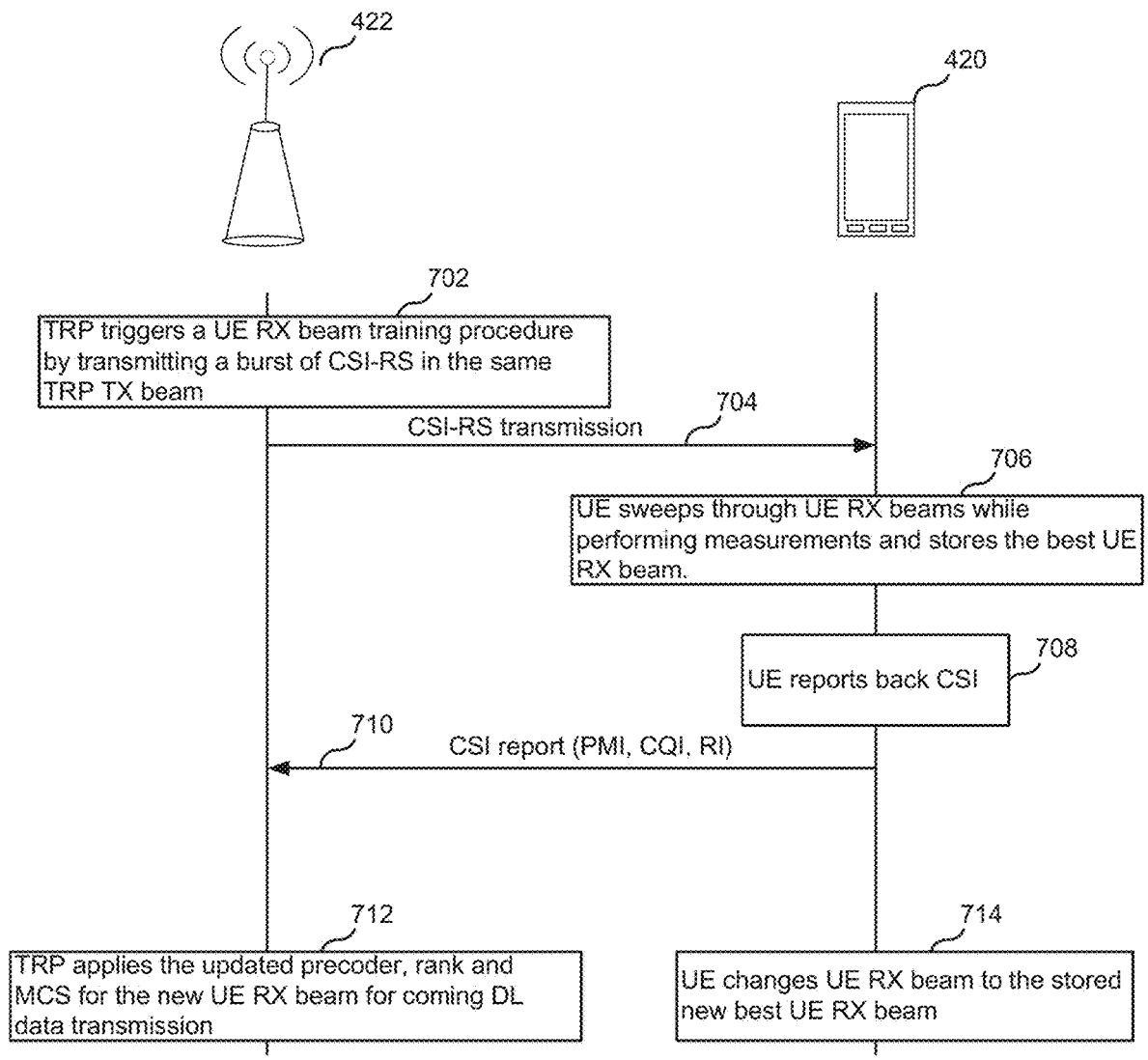
FIG. 7 is a flow chart according to some embodiments.

FIG. 7 illustrates a flow diagram between TRP 422 and UE 420 according to one embodiment. A UE RX beam training procedure is performed where UE 420 selects a new UE RX beam, at 706. For example, the UE may sweep through different UE RX beams while performing measurements on CSI-RSs. This type of UE RX beam sweep may be triggered, at 702, by triggering a preconfigured CSI report setting including an indication that the TRP 422 (e.g., gNB) will hold its TX beam constant for the entire CSI-RS transmission 704 and that no CSI report is expected from the UE. For example, the DCI containing the CSI report trigger does not necessarily contain an UL grant for subsequent PUSCH and/or PUCCH transmission. The UE then stores the best UE RX beam from the UE beam training procedure, but does not (yet) apply it on the UE beamformer.

Subsequently, the TRP 422 (e.g., gNB) beamforms a CSI-RS, at 704, with the currently best TRP TX beam and the UE is instructed to report CSI and report back a CSI feedback report, which may be carried on a PUCCH or PUSCH transmission, at 708-710. In some embodiments, the UE is triggered to report CSI with an aperiodic CSI report request (e.g., from TRP 422). In embodiments, such a trigger may include the DCI carrying the CSI request, and the request may comprise an UL grant scheduling a set of UL resources for a subsequent PUSCH and/or PUCCH transmission to carry the CSI report. In other embodiments, the UE may measure and report periodically on a periodic CSI-RS resource (e.g., the UE may have been RRC configured to do so). In embodiments, the CSI report may be carried on the PUCCH using a pre-configured PUCCH resource.

After some time (e.g., after a predetermined number of slots after the slot where the UL transmission carrying the CSI report was transmitted), the UE switches to the stored best UE RX beam for PDSCH reception, at 714. At the same time, at 712, the TRP applies the new precoder, rank, and MCS for the DL transmission.

In some embodiments, multiple BPLs are maintained and the TRP (e.g., gNB) includes a beam indication in the triggers for the UE RX beam sweep, CSI reporting, and PDSCH scheduling. The beam indication indicates which BPL the UE shall assume. For instance, the TRP (e.g., gNB) could trigger a UE RX beam sweep on a first BPL while scheduling PDSCH on a second BPL. In this case, there might be a larger time interval between when a UE RX beam sweep is triggered for a certain BPL (e.g., first BPL) and when the subsequent CSI report for that (e.g., first) BPL is triggered, since several BPLs are maintained. This larger interval, for instance, may allow communication to be carried out on the other BPL (e.g., second BPL) before the CSI feedback report at 708-710 is transmitted to the TRP (e.g., gNB).

Figure 8:
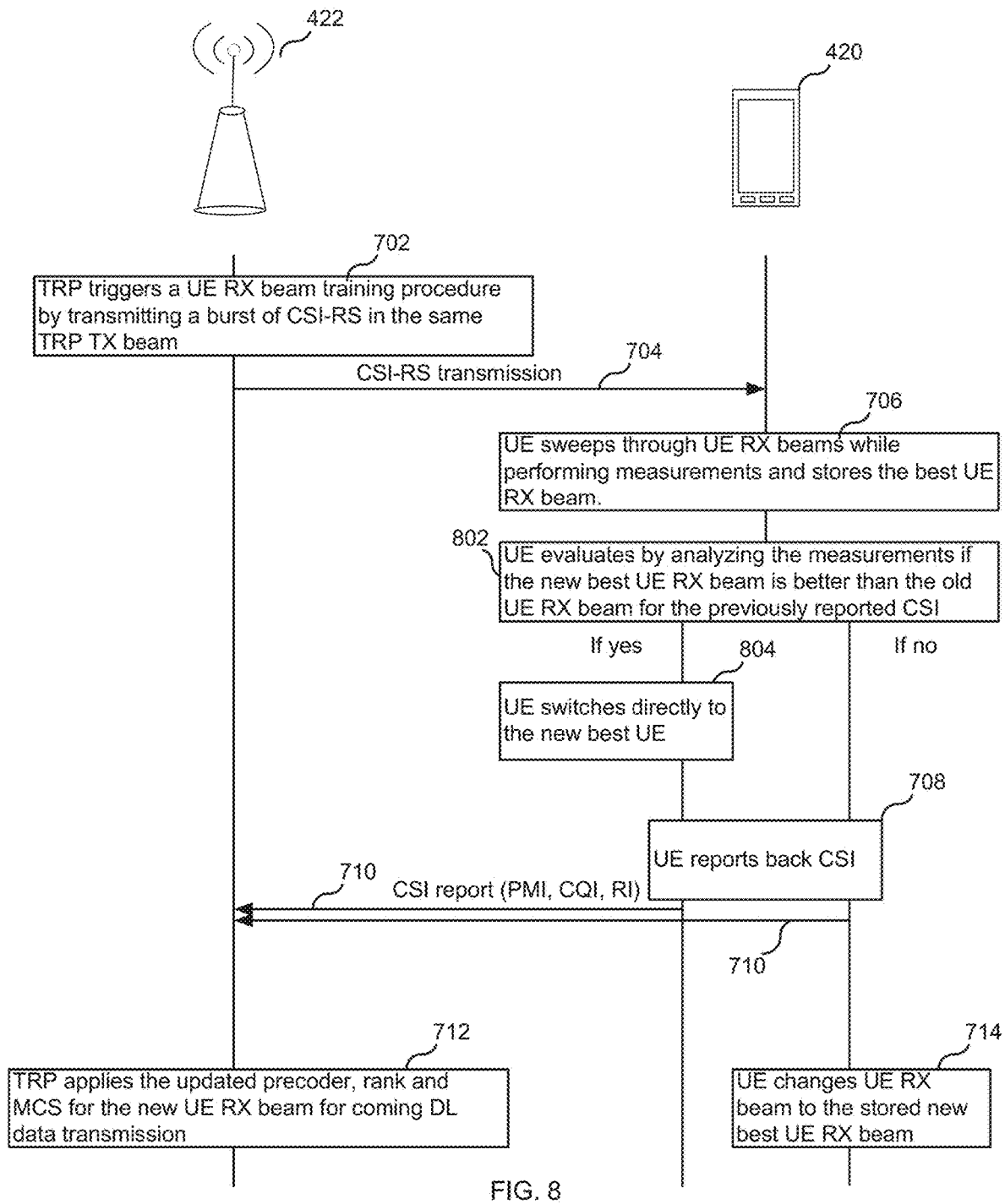
FIG. 8 is a flow chart according to some embodiments.

FIG. 8 illustrates a flow diagram between TRP 422 and UE 420 according to another embodiment. A UE RX beam training procedure may be performed by the UE at 706. For example, the UE may sweep through different UE RX beams and determines a new best UE RX beam. The UE then evaluates, for the currently used TRP TX beam (reflected in the previously reported CSI), whether the new UE RX beam or the old UE RX beam has better performance, at 802. For example, the UE has previously stored information about which precoder, rank, and MCS, was reported to the TRP in the last CSI report. The UE may use this information together with the measurements of the UE RX beam training to evaluate if the new UE RX beam is better than the old UE RX beam for the current DL precoder, rank, and MCS used by the TRP during transmission.

For instance, the UE may evaluate a set of RX beam candidates $F_{RX}^{(1)}$, $F_{RX}^{(2)}$ . . . . These beam candidates represent weights applied to the UE's reception antennas during beam forming. Where the precoder matrix W is applied by the TRP at transmission, the RX beam $F_{RX}$ is applied by the UE at reception. The RX beam $F_{RX}$ (and the beam candidates $F_{RX}^{(1)}$, $F_{RX}^{(2)}$ . . . ) are of size $N_R \times N_E$, where $N_E$ is total number of antenna elements at the UE. Evaluation of the different beam candidates may, for example, be based on an estimate of effective CSI-RS channels $H_{\textit{eff}}^{(1)}$, $H_{\textit{eff}}^{(2)}$, . . . where each effective channel estimate is as in Equation 3 below, where the full matrix channel H (size $N_E \times N_P$, i.e. number of ports at TRP by number of antenna elements at UE) is reduced to an effective channel matrix $H_{\textit{eff}}$ (size $N_R \times N_P$, i.e. number of ports at TRP by number of ports at UE) by applying the weights of the analog beamformer $F_{RX}$ (size $N_R \times N_E$):

$$H_{\textit{eff}}^{(j)} = F_{RX}^{(j)} H \qquad \text{(Equation 3)}$$

In Equation 3, H is the channel matrix from the CSI-RS antenna ports to the UE antennas (which may not be an observable quantity). H has size $N_E \times N_P$, where $N_P$ is the number of CSI-RS ports. Therefore, $H_{\textit{eff}}^{(j)}$ will have size $N_R \times N_P$. The index j denotes the RX beam candidate index.

Based on the effective channel estimate for a given RX beam (e.g., the selected best RX beam), the UE may determine a preferred precoder matrix W (and corresponding PMI) by analyzing the resulting throughput of the hypothetical transmission given by Equation 4 below:

$$y = H_{\textit{eff}}^{(j)} W x + e \qquad \text{(Equation 4)}$$

In Equation 4, y is a hypothetical received signal vector (i.e. received by the UE from the TRP) and x is a hypothetical transmitted signal vector (i.e. transmitted by the TRP to the UE). y will have size $N_R \times 1$; x will have size $r \times 1$. e is a hypothetical noise vector.

After performing the UE RX beam sweep and determining a new best RX beam $F_{RX}^{(NEW)}$, the UE determines if it should switch to the new RX beam directly or wait until the TRP (e.g., gNB) updates its precoding based on the CSI report; the UE may make this determination at least in part by comparing the throughput of the hypothetical transmissions using the new beam $F_{RX}^{(NEW)}$ (resulting in an effective channel estimate $H_{eff}^{(NEW)}$) or the old beam $F_{RX}^{(OLD)}$ (resulting in an effective channel estimate $H_{eff}^{(OLD)}$). Using Equation 4 with these two effective channel estimates and with $W=W^{(OLD)}$ being the precoder reported with the old RX beam, results in hypothetical transmissions $y_{new}$ and $y_{old}$ that may be compared. Note that both channel estimates may be obtained during a single UE RX beam sweep.

If the new UE RX beam is better than the old UE RX beam also for the current DL transmissions, the UE directly changes from the old to the new UE RX beam at 804. However, if that is not the case, then the UE should keep the old UE RX beam until a predetermined time after the CSI report for the new UE RX beam has been signaled.

Figure 9:
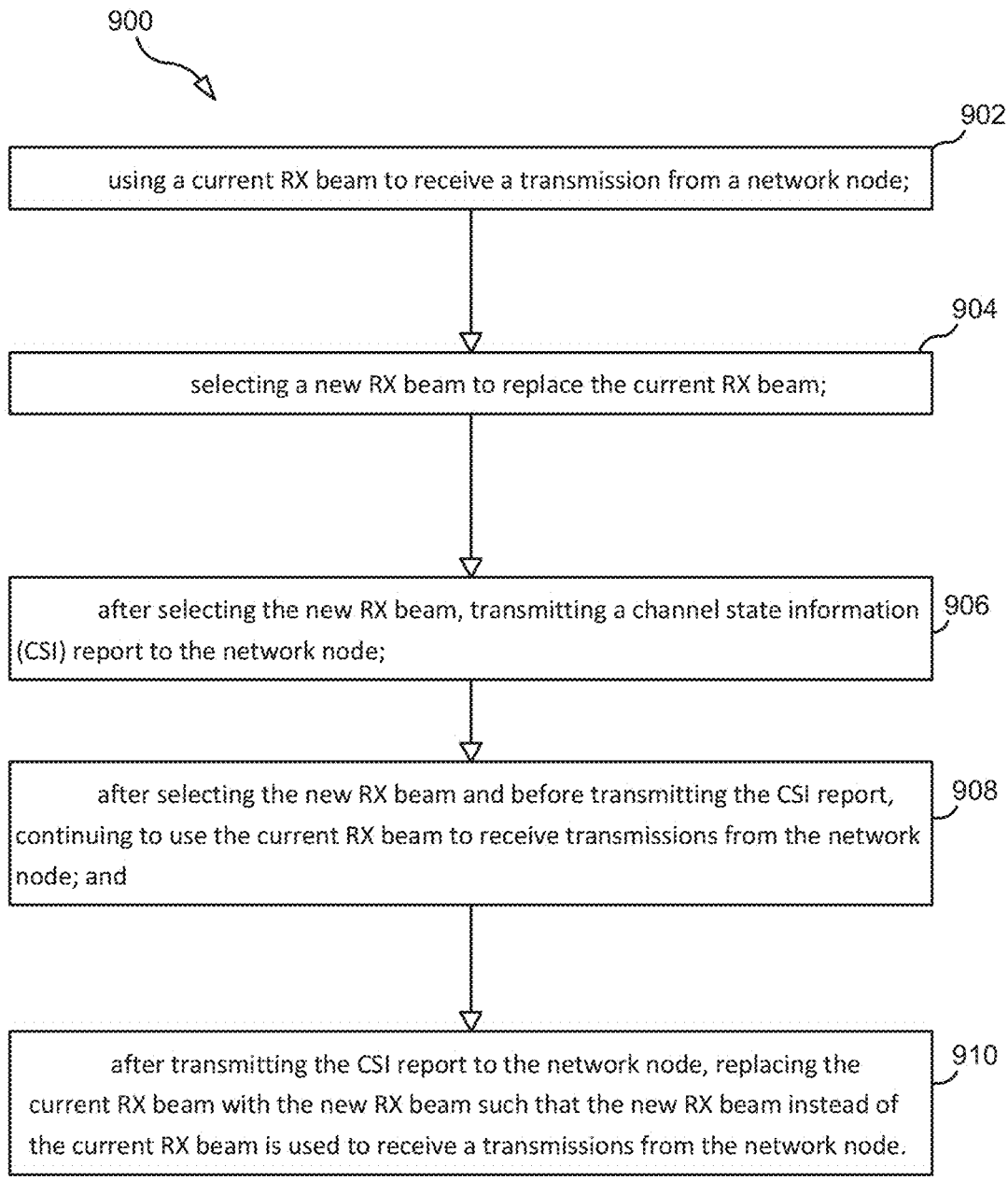
FIG. 9 is a flow chart according to some embodiments.

FIG. 9 is a flow chart for a process 900 for receive (RX) beam switching. Process 900 may be performed by a UE (e.g., a smartphone, a laptop, a tablet, a sensor, an appliance, or any other device capable of wireless communication). The process includes using a current RX beam to receive a transmission from a network node (step 902). The process further includes selecting a new RX beam to replace the current RX beam (step 904). The process further includes, after selecting the new RX beam, transmitting a channel state information (CSI) report to the network node (step 906). The process further includes, after selecting the new RX beam and before transmitting the CSI report, continuing to use the current RX beam to receive transmissions from the network node (step 908). The process further includes, after transmitting the CSI report to the network node, replacing the current RX beam with the new RX beam such that the new RX beam instead of the current RX beam is used to receive a transmissions from the network node (step 910).

In some embodiments, in process 900 (or other processes described here, such as process 1000 below), selecting the new RX beam to replace the current RX beam includes (1) receiving, from the network node (e.g., network node 422), a plurality of CSI reference symbols (CSI-RSs) corresponding to one or more transmit (TX) beams; (2) performing reference-signal (RS) measurements on the plurality of CSI-RS s; and (3) comparing the RS measurements. Selecting the new RX beam to replace the current RX beam may also (and/or additionally), include sweeping through a plurality of UE RX candidate beams while performing the RS measurements, and may also (and/or additionally) be performed in response to a trigger from the network node. The trigger may indicate that the network node will hold its TX beam constant for the entire CSI-RS transmission and that no CSI report is expected from the UE for at least a time duration. In some embodiments, a downlink control information (DCI) containing the trigger does not include an uplink grant for subsequent PUSCH and/or PUCCH transmission.

In some embodiments, transmitting the CSI report to the network node is performed in response to a trigger received from the network node. In other embodiments, transmitting the CSI report to the network node is performed in response to a prescheduled periodic timer. In some embodiments, replacing the current RX beam with the new RX beam is performed a predetermined time offset (e.g., a predetermined number of slots) after transmitting the CSI report to the network node. In some embodiments, a first beam pair link includes a first UE RX beam and a first network node TX beam and a second beam pair link includes a second UE RX beam and a second network node TX beam are maintained. In these embodiments, the network node may indicate which of the first or second beam pair link the UE shall use at a given time.

Figure 10:
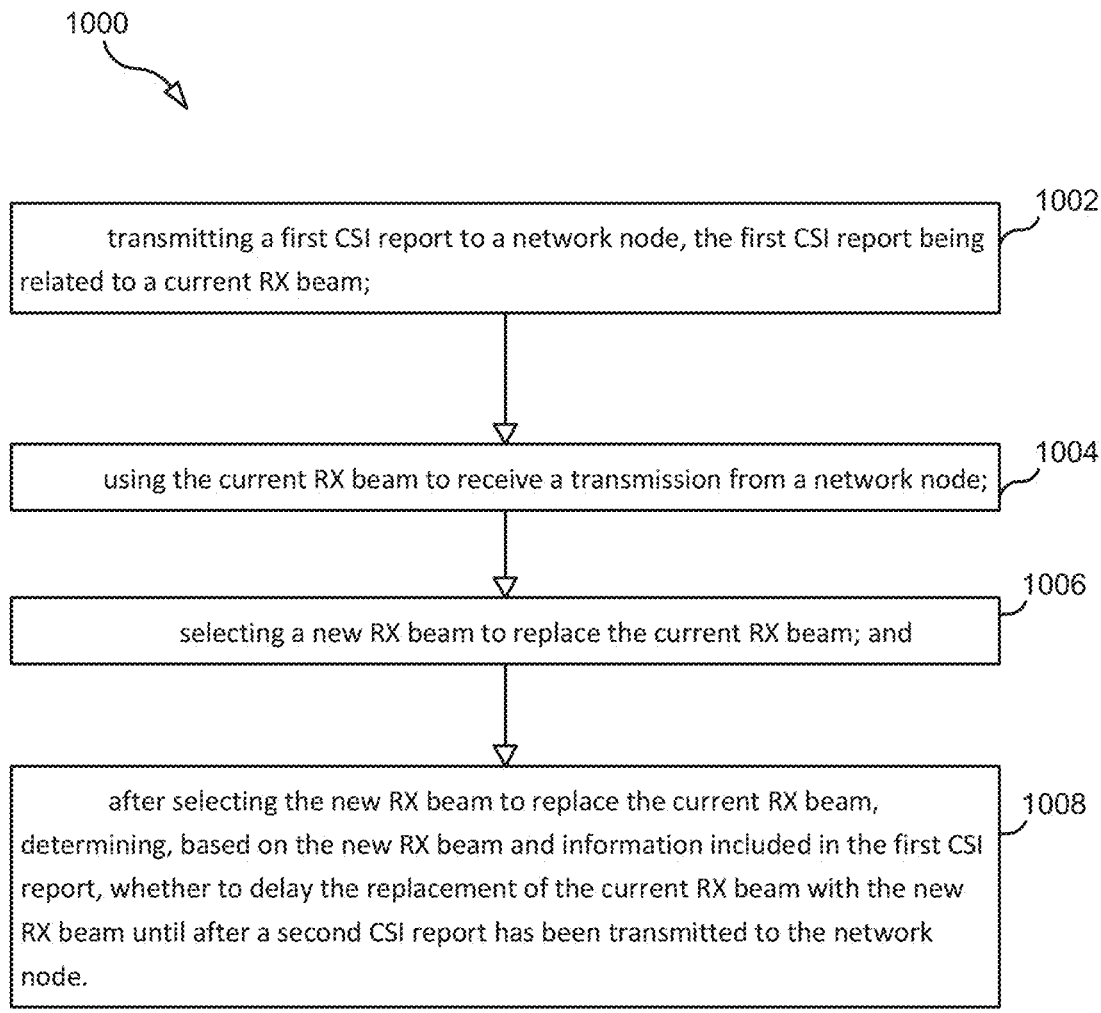
FIG. 10 is a flow chart according to some embodiments.

FIG. 10 is a flow chart for a process 1000 for receive (RX) beam switching. Process 1000 may be performed by a UE. The process includes transmitting a first CSI report to a network node, the first CSI report being related to a current RX beam (step 1002). The method further includes using the current RX beam to receive a transmission from a network node (step 1004). The method further includes selecting a new RX beam to replace the current RX beam (step 1006). The method further includes, after selecting the new RX beam to replace the current RX beam, determining, based on the new RX beam and information included in the first CSI report, whether to delay the replacement of the current RX beam with the new RX beam until after a second CSI report has been transmitted to the network node (step 1008).

In some embodiments, determining, based on the new RX beam and information included in the first CSI report, whether to delay the replacement of the current RX beam with the new RX beam until after a second CSI report has been transmitted to the network node includes evaluating whether the new RX beam or old RX beam has better performance with a precoding matrix indicated by the first CSI report. In some embodiments, the new RX beam has better performance than the old RX beam with the precoding matrix indicated by the first CSI report if and only if the new RX beam has a higher estimated throughput than the old RX beam; or if and only if the new RX beam has a higher estimated Shannon capacity than the old RX beam; or if and only if the new RX beam has a higher rank than the old RX beam.

In some embodiments, the process further includes, after determining, based on the new RX beam and information included in the first CSI report, not to delay the replacement of the current RX beam with the new RX beam until after a second CSI report has been transmitted to the network node, immediately replacing the current RX beam with the new RX beam (i.e., replacing the current RX beam with the new RX beam before the CSI report is sent) such that the new RX beam instead of the current RX beam is used to receive a transmission from the network node. In this context, immediately replacing the current TX beam with the new RX beam allows for the UE to wait, if the determination is made in the middle of a OFDM symbol, until the OFDM symbol is finished before changing to the new UE RX beam.

In some embodiments, the process further includes, after determining, based on the new RX beam and information included in the first CSI report, to delay the replacement of the current RX beam with the new RX beam until after a second CSI report has been transmitted to the network node, (1) continuing to use the current RX beam to receive transmissions from the network node; and (2) transmitting the second CSI report to the network node; and after transmitting the second CSI report to the network node, replacing the current RX beam with the new RX beam such that the new RX beam instead of the current RX beam is used to receive a transmission from the network node.

Figure 11:
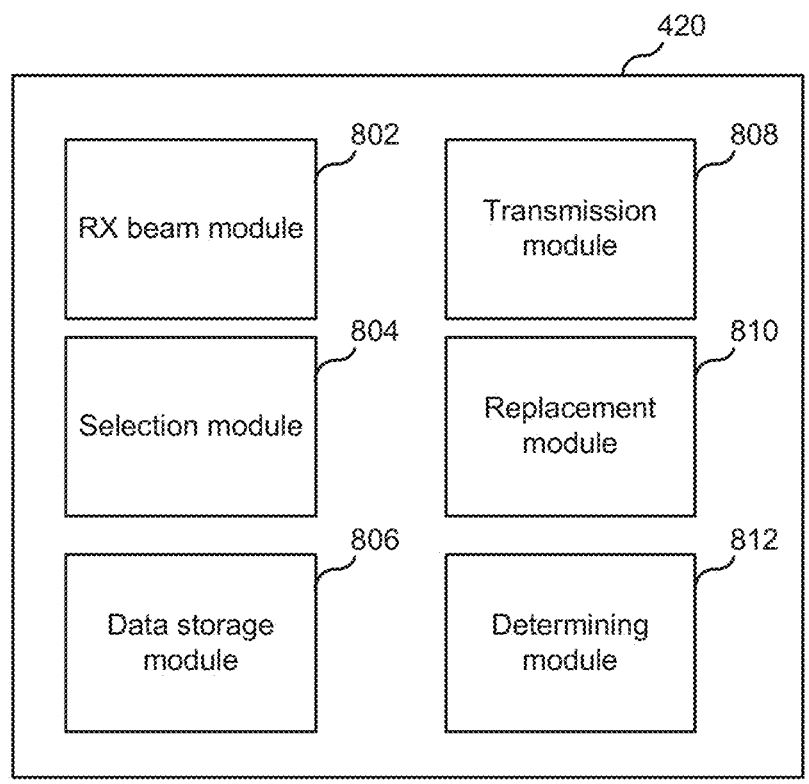
FIG. 11 is a diagram showing functional modules of a UE according to some embodiments.

FIG. 11 is a diagram showing functional modules of UE 420 according to some embodiments. As shown in FIG. 11, the UE includes an RX beam module 802, a selection module 804, a data storage module 806, a transmission module 808, a replacement module 810, and a determining module 812. The RX beam module 802 is configured to use a current RX beam to receive a transmission from a network node. The selection module 804 is configured to select a new RX beam to replace the current RX beam. The data storage module 806 is configured to store the new RX beam. The transmission module 808 is configured to, after selecting the new RX beam, transmit a CSI report to the network node. The RX beam module 802 is further configured to, after selecting the new RX beam and before transmitting the CSI report, continue to use the current RX beam to receive transmissions from the network node. The replacement module 810 is configured to, after transmitting the CSI report to the network node, replace the current RX beam with the new RX beam such that the new RX beam instead of the current RX beam is used to receive transmissions from the network node. The transmission module 808 is further configured to transmit a first CSI report to a network node, the first CSI report being related to a current RX beam. The determining module 812 is configured to, after selecting the new RX beam to replace the current RX beam, determining, based on the new RX beam and information included in the first CSI report, whether to delay the replacement of the current RX beam with the new RX beam until after a second CSI report has been transmitted to the network node.

Figure 12:
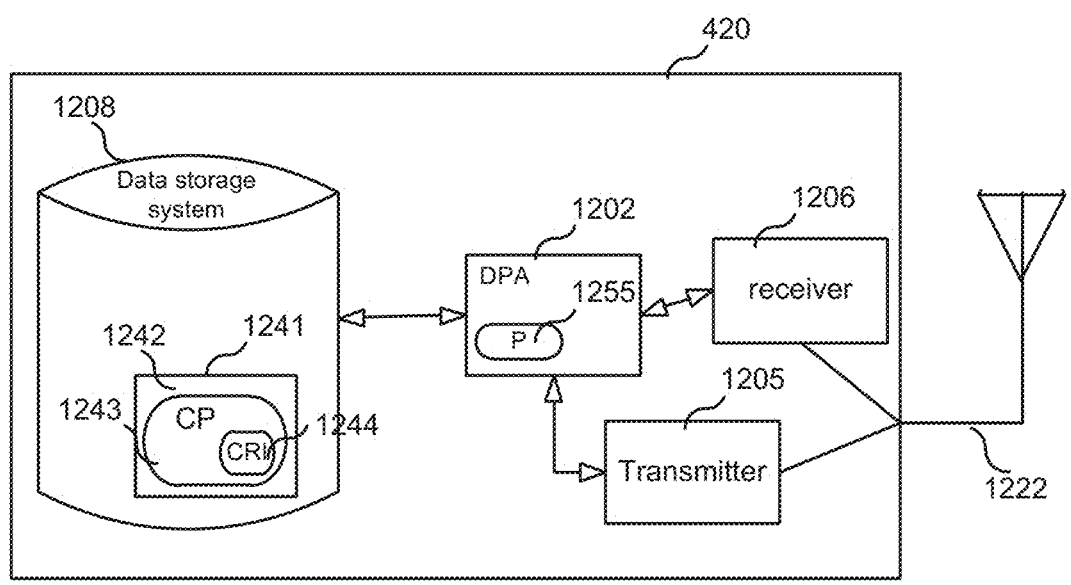
FIG. 12 is a block diagram of a wireless communications device according to some embodiments.

FIG. 12 is a block diagram of UE 420 according to some embodiments. As shown in FIG. 12, the UE may comprise: a data processing apparatus (DPA) 1202, which may include one or more processors (P) 1255 (e.g., a general purpose microprocessor and/or one or more other processors, such as an application specific integrated circuit (ASIC), field-programmable gate arrays (FPGAs), and the like); a transmitter 1205 and a receiver 1204 coupled to an antenna 1222 for enabling the UE to transmit data to and receive data from a network node; and local storage unit (a.k.a., "data storage system") 1208, which may include one or more non-volatile storage devices and/or one or more volatile storage devices (e.g., random access memory (RAM)). In embodiments where the UE includes a general purpose microprocessor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, but not limited, to magnetic media (e.g., a hard disk), optical media, memory devices (e.g., random access memory), and the like. In some embodiments, the CRI 1244 of computer program 1243 is configured such that when executed by data processing apparatus 1202, the CRI causes the UE to perform steps described above (e.g., steps described above with reference to the flow charts). In other embodiments, the UE may be configured to perform steps described herein without the need for code. That is, for example, data processing apparatus 1202 may consist merely of one or more ASICs. Hence, the features of the embodiments described herein may be implemented in hardware and/or software.

Figure 13:
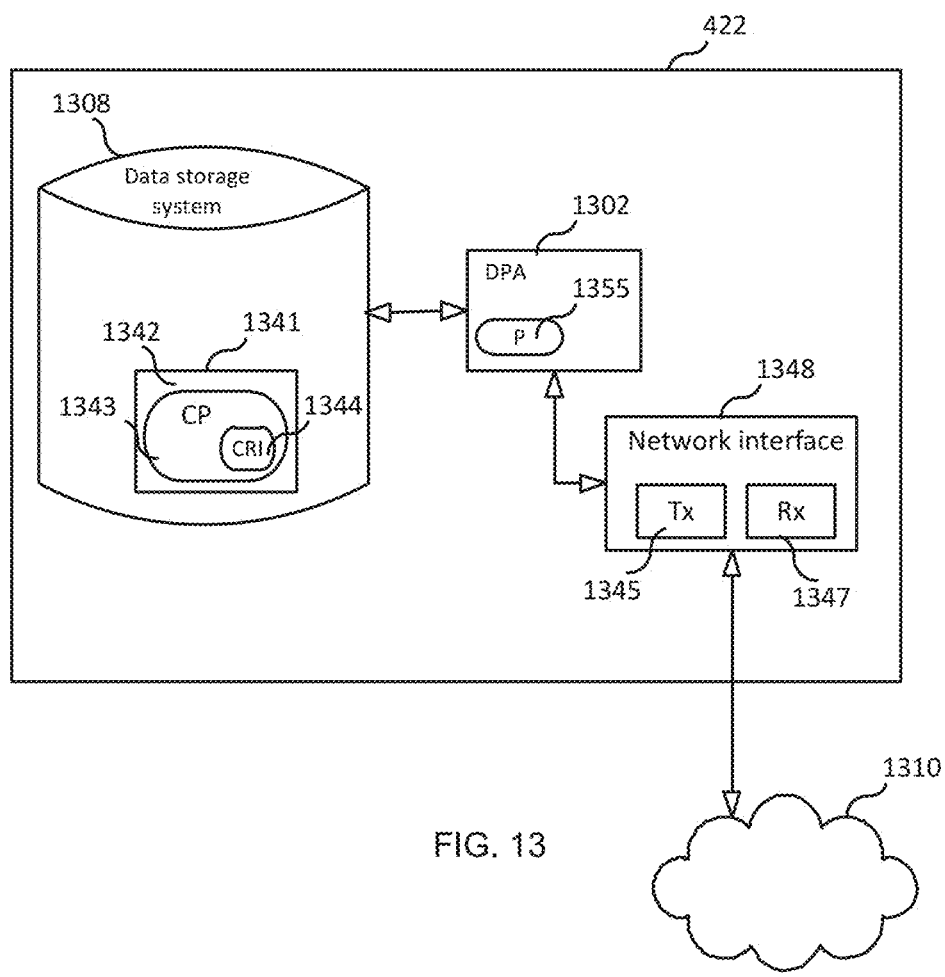
FIG. 13 is a block diagram of a network node according to some embodiments.

FIG. 13 is a block diagram of a network node 422 according to some embodiments. As shown in FIG. 13, the network node may comprise: a data processing apparatus (DPA) 1302, which may include one or more processors (P) 1355 (e.g., a general purpose microprocessor and/or one or more other processors, such as an application specific integrated circuit (ASIC), field-programmable gate arrays (FPGAs), and the like); a network interface 1348 comprising a transmitter (Tx) 1345 and a receiver (Rx) 1347 for enabling computer apparatus to transmit data to and receive data from other nodes connected to a network 1310 (e.g., an Internet Protocol (IP) network) to which network interface 1348 is connected; and local storage unit (a.k.a., "data storage system") 1308, which may include one or more non-volatile storage devices and/or one or more volatile storage devices (e.g., random access memory (RAM)). In embodiments where the network node includes a general purpose microprocessor, a computer program product (CPP) 1341 may be provided. CPP 1341 includes a computer readable medium (CRM) 1342 storing a computer program (CP) 743 comprising computer readable instructions (CRI) 1344. CRM 1342 may be a non-transitory computer readable medium, such as, but not limited, to magnetic media (e.g., a hard disk), optical media, memory devices (e.g., random access memory), and the like. In some embodiments, the CRI 1344 of computer program 1343 is configured such that when executed by data processing apparatus 1302, the CRI causes computer apparatus to perform steps described herein (e.g., steps described herein with reference to the flow charts and/or message flow diagrams). In other embodiments, the network node may be configured to perform steps described herein without the need for code. That is, for example, data processing apparatus 1302 may consist merely of one or more ASICs. Hence, the features of the embodiments described herein may be implemented in hardware and/or software.

While various embodiments of the present disclosure are described herein (including the appendices), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:
1. A method for receive (RX) beam switching, the method being performed by a user equipment (UE) and comprising:
the UE using a current UE RX beam to receive data transmitted by a network node;
the UE selecting a new UE RX beam to replace the current UE RX beam;
the UE after selecting the new UE RX beam to replace the current UE RX beam, transmitting a channel state information (CSI) report to the network node;
after the UE selects the new UE RX beam to replace the current UE RX beam and before transmitting the CSI report, the UE continuing to use the current UE RX beam to receive data transmitted by the network node; and
after selecting the new UE RX beam and after transmitting the CSI report to the network node, the UE replacing the current UE RX beam with the new UE RX beam such that the new UE RX beam instead of the current UE RX beam is used to receive data transmitted by the network node, wherein
each said UE RX beam is beam generated by the UE,
selecting the new UE RX beam to replace the current UE RX beam is performed in response to a trigger from the network node, and the trigger from the network node indicates that the network node will hold its TX beam constant for an entire reference signal transmission and that no CSI report is expected from the UE for at least a time duration.

2. The method of claim 1, wherein selecting the new UE RX beam to replace the current UE RX beam comprises:
receiving, from the network node, a plurality of CSI reference symbols (CSI-RS s) corresponding to one or more transmit (TX) beams;
performing reference-signal (RS) measurements on the plurality of CSI-RS s; and
comparing the RS measurements.

3. The method of claim 1, wherein selecting the new UE RX beam to replace the current UE RX beam further comprises:
sweeping through a plurality of UE RX candidate beams while performing the RS measurements.

4. The method of claim 1, wherein a downlink control information (DCI) containing the trigger does not include an uplink grant for subsequent PUSCH and/or PUCCH transmission.

5. The method of claim 1, wherein transmitting the CSI report to the network node is performed in response to a trigger received from the network node.

6. The method of claim 1, wherein
the method further comprises determining whether the new UE RX beam would be better than the current UE RX beam with respect to receiving data transmitted by the network node that occurs prior to the UE transmitting the CSI report, and
the UE is configured to delay replacing the current UE RX beam with the new UE RX beam as a result of determining that the new UE RX beam is not better than the current UE RX beam.

7. The method of claim 1, wherein replacing the current UE RX beam with the new UE RX beam is performed at least a predetermined amount of time after transmitting the CSI report to the network node.

8. The method of claim 1, wherein a first beam pair link comprising a first UE RX beam and a first network node TX beam and a second beam pair link comprising a second UE RX beam and a second network node TX beam are maintained, and wherein the network node indicates which of the first or second beam pair link the UE shall use at a given time.

9. A computer program product comprising a non-transitory computer readable medium storing instructions for programming a user equipment to perform the method of claim 1.

10. The method of claim 1, wherein the step of the UE using a current UE RX beam to receive data transmitted by the network node comprises:
the UE receiving a signal transmitted by the network node; and
the UE processing the received signal using the current UE RX beam to obtain the data.

11. A method for receive (RX) beam switching, the method being performed by a user equipment (UE) and comprising:
the UE transmitting a first CSI report to a network node, the first CSI report being related to a current UE RX beam;
the UE using the current UE RX beam to receive a transmission from a network node;
the UE selecting a new UE RX beam to replace the current UE RX beam; and
after the UE selects the new UE RX beam to replace the current UE RX beam, the UE determining, based on the new UE RX beam and information included in the first CSI report, whether to delay the replacement of the current UE RX beam with the new UE RX beam until after a second CSI report has been transmitted to the network node, wherein
each said UE RX beam is beam generated by the UE.

12. The method of claim 11, wherein determining, based on the new UE RX beam and information included in the first CSI report, whether to delay the replacement of the current UE RX beam with the new UE RX beam until after a second CSI report has been transmitted to the network node comprises:
evaluating whether the new UE RX beam or current UE RX beam has better performance with a precoding matrix indicated by the first CSI report.

13. The method of claim 12, wherein the new UE RX beam has better performance than the current UE RX beam with the precoding matrix indicated by the first CSI report if and only if the new UE RX beam has a higher estimated throughput than the current UE RX beam.

14. The method of claim 12, wherein the new UE RX beam has better performance than the current UE RX beam with the precoding matrix indicated by the first CSI report if and only if the new UE RX beam has a higher estimated Shannon capacity than the current UE RX beam.

15. The method of claim 12, wherein the new UE RX beam has better performance than the current UE RX beam with the precoding matrix indicated by the first CSI report if and only if the new UE RX beam has a higher rank than the current UE RX beam.

16. The method of claim 11, further comprising:
after determining, based on the new UE RX beam and information included in the first CSI report, not to delay the replacement of the current UE RX beam with the new UE RX beam until after a second CSI report has been transmitted to the network node, immediately replacing the current UE RX beam with the new UE RX beam such that the new UE RX beam instead of the current UE RX beam is used to receive a transmissions from the network node.

17. The method of claim 11, further comprising:
after determining, based on the new UE RX beam and information included in the first CSI report, to delay the replacement of the current UE RX beam with the new UE RX beam until after a second CSI report has been transmitted to the network node, (1) continuing to use the current UE RX beam to receive transmissions from the network node; and (2) transmitting the second CSI report to the network node; and
after transmitting the second CSI report to the network node, replacing the current UE RX beam with the new UE RX beam such that the new UE RX beam instead of the current UE RX beam is used to receive a transmissions from the network node.

18. The method of claim 17, wherein replacing the current UE RX beam with the new UE RX beam is performed a predetermined time offset after transmitting the second CSI report to the network node.

19. A computer program product comprising a non-transitory computer readable medium storing instructions for programming a user equipment to perform the method of claim 11.

20. A user equipment (UE) for receive (RX) beam switching, the UE being adapted to:

use a current UE RX beam to receive data transmitted by a network node;
select a new UE RX beam to replace the current UE RX beam;
after selecting the new UE RX beam, transmit a channel state information (CSI) report to the network node;
after selecting the new UE RX beam and before transmitting the CSI report, continue to use the current UE RX beam to receive data transmitted by the network node; and
after transmitting the CSI report to the network node, replace the current UE RX beam with the new UE RX beam such that the new UE RX beam instead of the current UE RX beam is used to receive data transmitted by the network node, wherein
each said UE RX beam is beam generated by the UE,
selecting the new UE RX beam to replace the current UE RX beam is performed in response to a trigger from the network node, and
the trigger from the network node indicates that the network node will hold its TX beam constant for an entire reference signal transmission and that no CSI report is expected from the UE for at least a time duration.

21. A user equipment (UE) for receive (RX) beam switching, the UE being adapted to:
transmit a first CSI report to a network node, the first CSI report being related to a current UE RX beam;
use the current UE RX beam to receive a transmission from a network node;
select a new UE RX beam to replace the current UE RX beam; and
after selecting the new UE RX beam to replace the current UE RX beam, determine, based on the new UE RX beam and information included in the first CSI report, whether to delay the replacement of the current UE RX beam with the new UE RX beam until after a second CSI report has been transmitted to the network node, wherein
each said UE RX beam is beam generated by the UE.

* * * * *